No. 744,100. PATENTED NOV. 17, 1903.

C. A. PETTIE.
VEHICLE TIRE.
APPLICATION FILED JAN. 2, 1903.

NO MODEL.

Witnesses
Inventor
Charles A. Pettie
By his Attorney
N. L. Frothingham

No. 744,100. Patented November 17, 1903.

UNITED STATES PATENT OFFICE.

CHARLES A. PETTIE, OF BROOKLYN, NEW YORK.

VEHICLE-TIRE.

SPECIFICATION forming part of Letters Patent No. 744,100, dated November 17, 1903.

Application filed January 2, 1903. Serial No. 137,450. (No model.)

*To all whom it may concern:*

Be it known that I, CHARLES A. PETTIE, a citizen of the United States, residing at the borough of Brooklyn, city of New York, county of Kings, and State of New York, have invented certain new and useful Improvements in Vehicle-Tires, of which the following is a specification, reference being had therein to the accompanying drawings, which form a part thereof.

The invention relates to vehicle-tires, and more particularly to that class thereof employing a resilient or cushion tread and a substantially rigid core upon which said tread is built and to which it is secured.

The objects of the invention are to provide a tire of this class wherein the tread will be firmly secured to the core in a manner to resist the tendency to tear away therefrom under the various severe strains and pressures to which it is subjected, wherein the sides of the tire adjacent to the felly will be free to a great extent from direct lateral tension through direct vertical pressure, wherein the said portions will be secured and reinforced in a manner to have said core to a large extent withstand such strains, and wherein the entire tire will possess a compact homogeneity throughout.

A still further object is to provide a tire which may be secured to the felly without the employment of flanking rings or flanges and, when desired, without the necessity for boring holes in or otherwise mutilating the wheel-felly, which may be made endless and yet be capable of application to fellies which vary to a limited extent in diameter and which may also be attached to fellies the widths of which are at variance to a limited extent.

A still further object is to provide a tire employing a continuous core in which the adjacent or abutting ends of said core may be secured firmly in position relative to each other in a manner to free the balance of the tire from strains due to a tendency of said ends to separate or from other disarrangement thereof.

The invention consists, broadly, in embodying in a vehicle-tire a core, an anchoring-strip consisting of alternating strips of resilient material and of substantially non-resilient material, said core and said strip being secured together by any desired means, a resilient tread attached to said anchoring-strip, and means for securing said tire on a felly, and in such other novel features of construction as are hereinafter set forth and described, and more particularly pointed out in the claims hereto appended.

Figure 1:
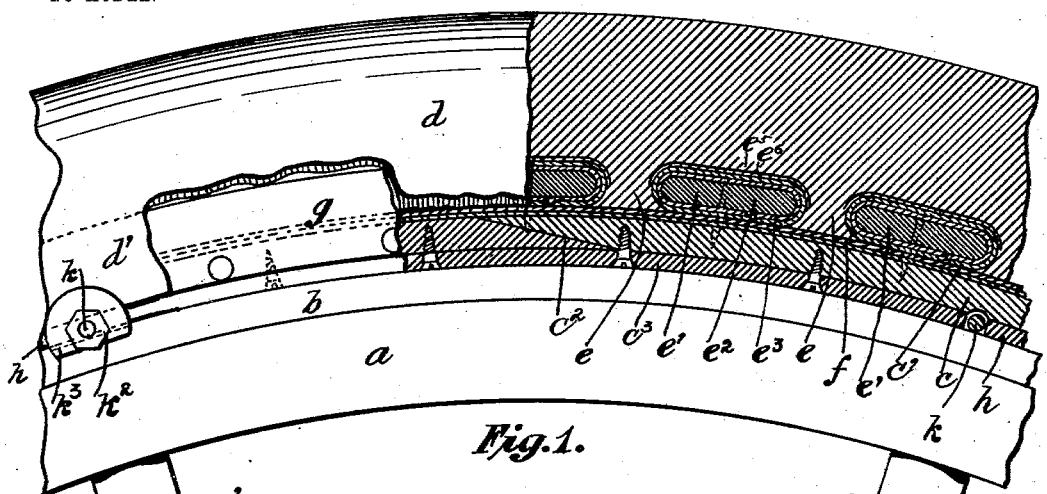
Figure 2:
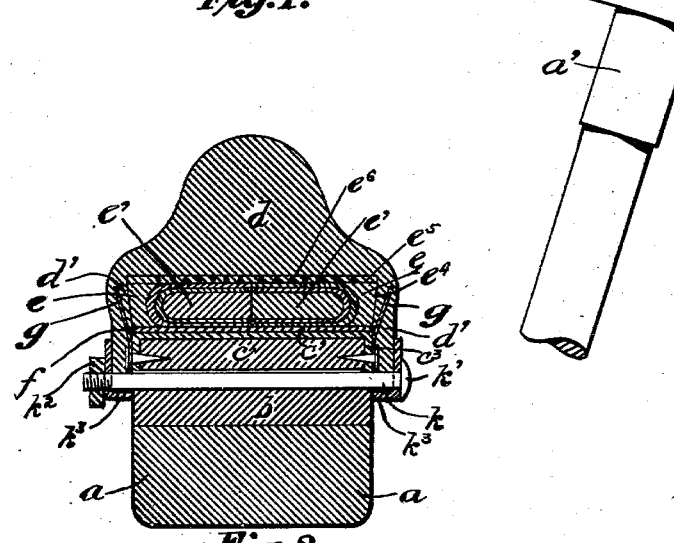
Figure 3:
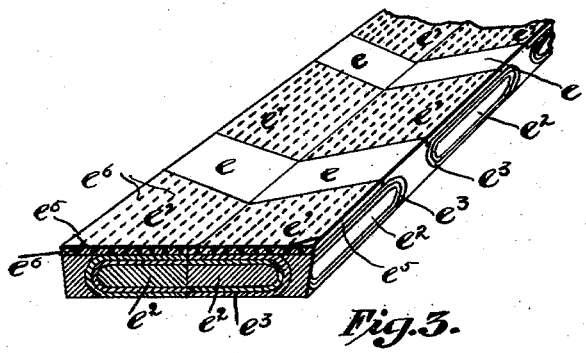

Referring to the drawings, Figure 1 is a portion of a wheel-felly with a tire embodying my invention in place thereon, portions of said tire being shown in longitudinal section, in elevation, and broken away to disclose the arrangement of the side reinforcing-flaps hereinafter referred to. Fig. 2 is a cross-section of the tire and felly, and Fig. 3 is a perspective view of the anchoring-strip detached from but prepared for application to the tire.

Like letters refer to like parts throughout the several views.

In the drawings, $a$ indicates a portion of an ordinary wheel-felly, and $a'$ $a'$ spokes of a wheel. The wheel is provided with an ordinary metal hoop-tire $b$, which serves as a binder for the wheel structure and also as a base for the resilient tire hereinafter described.

The resilient tire is provided with a core $c$, upon and about which the tread $d$ is built. This core is substantially non-elastic and preferably consists of a continuous band of wood properly dried and bent to shape and having a metallic sheathing $c'$ covering the upper face and both sides thereof. The adjacent ends of this core are preferably united by a scarf-joint, as at $c^2$, and this joint is rendered permanent by a plate $c^3$, attached to each end by means of screws or in any other desired manner. No glue or other binding agent is used, the efficiency of such being destroyed when subjected to the heat of vulcanization. Any other than a scarf-joint may be employed, if preferred.

To insure a proper union of the resilient and the non-resilient parts of the tire, the core $c$ is provided with what may be termed an "anchoring-strip," consisting of alternating strips of resilient material, as rubber, $e$, and of material, as $e'$, which is substantially non-resilient. Each of the strips $e'$ comprises a small block of wood $e^2$, wrapped in fabric $e^3$, and is provided with an adhesive upper facing, preferably of rubber, $e^5$, bound thereto by the strands $e^6$, of cord or other similar material. A fabric base $f$ is interposed between said anchoring-strip and said core. Thus the strips $e$ are afforded an extensive gripping area, which includes the base $f$ and the adjoining sides of the successive strips $e'$, the line of which surfaces, it will be observed, is irregular. The said anchoring-strip is so attached to said core $c$ as to be practically integral therewith, as by nailing the blocks $e^2$ thereto or in any other desired manner. In the drawings I have shown this anchoring-strip as composed of parallel longitudinal sections and the separate strips of each section extending diagonally transversely of the tire—an arrangement designed to prevent any single strip $e'$ $e'$ being subjected to the same strain at one and the same time throughout its length. The said strip on each side of the tire is preferably overhung slightly, as at $e^4$.

In building up a tire the parts heretofore described are first assembled, the rubber of the strips $e$ and of the facings $e^5$ being green stock and prepared for vulcanization. While these strips $e$ and facings $e^5$ through vulcanization may lose their identity as parts of the anchoring-strip to a certain extent, becoming, as they do, integrally united to the tread $d$ and forming the main connecting-links between the core and said tread, still, as they have no function as a part of this tread proper, they may properly be considered at all times as parts of this strip. The fabric used is that ordinarily employed in the manufacture of rubber tires—duck impregnated with rubber to an extent to give it the desired adhesive properties, the facings $e^5$ being secured thereto partly through adhesion, but mainly through the strands $e^6$. The strips $e$, being always in intimate contact with the base $f$ as well as with the sides of the adjoining fabric $e^3$, covering the blocks $e^2$, an extended gripping-surface is afforded which in conjunction with the firm gripping area between the tread and the strips $e'$ through the respective facings $e^5$, firmly united thereto, when the tire is completed effectually resist that strain which in the ordinary tire tends to separate the tread from its base. The tread is then built up in the usual manner, green stock prepared for vulcanization being used and placed upon the anchoring-strip, the edges thereof, which are extended to form wings $d'$ $d'$, being brought over, so as to engage each edge of said strip, thus insuring direct contact thereof with the exposed ends of the strips $e$. A reinforcing fabric flap $g$, secured to each side of the core $c$, is embedded in the side wings $d'$ $d'$ of the tread and extend therein to a point conterminous or approximately conterminous with the bottom of the tread. The sides of the core $c$, as well as the flaps $g$, are completely enveloped by the wings $d'$ $d'$. The tread proper, $d$, is of gradually-diminished width from the anchoring-strip, so as to insure a direct vertical pressure being taken up entirely by the core $c$, thus relieving the side wings $d'$ from the effects thereof. The whole tire so built up is then placed in a mold and vulcanized and cured to the desired extent, the non-resilient portions being fixed in relation thereto by the vulcanization of the resilient portions of the tire. This process unites all rubber portions in one homogeneous mass, the tread portion being united to the strips $e$ on the tops as well as at the exposed ends thereof through the wings $d'$ and to the facings $e^5$ of the non-resilient strips $e'$ of the anchoring-strips. A tire so cured consists of one integral whole prepared for application to the felly of a wheel. To make this attachment, a plurality of segmental plates $h$, which correspond with the plate $c^3$, which, however, are independent of the tire structure, are wedged or forced between the core $c$ and the tire $b$. Any variance between the diameter of the wheel and that of the tire may be compensated for by the use of plates $h$ of a thickness to conform to the requirements of each case. The ends of these plates are spaced somewhat apart to permit the passage of a bolt $k$ therebetween, and, if desired, the core $c$ may be arched to provide a surface adapted to engage each bolt to aid in preventing the creeping of the tire. The number of plates $h$ employed is immaterial, being dependent upon the necessity for employing a greater or less number of bolts to meet the requirements of the service in which the tire is to be used. The finished appearance of the tire is also a desideratum.

The bolts $k$ are provided with large heads $k'$, and suitable washers $k^3$ are interposed between the nuts $k^2$ and the other wing $d'$.

If, as illustrated in the drawings, the resilient tire exceeds in width the felly, I employ a washer $k^3$, one side of which is upset at an angle sufficient to insure the engagement of this edge with the felly or tire $b$.

The operation of a vehicle-tire embodying my invention in so far as it has been possible to determine is as follows: The tread proper, $d$, of the tire acts as a cushion beyond the anchoring-strip only, this strip, the wings $d'$ $d'$, the base $f$, the flaps $g$, and the core $c$ acting more in the capacity of a more or less rigid base carrying such tread. When the tread is under compression, these parts are not affected materially. The strips $e$ of the anchoring-strip are prevented from giving with the tread $d$ by the adjoining strips $e'$, which, as stated, possess little or no resiliency, and thus resist compression themselves and prevent that of the said strips $e$. Under side pressures on the tread, however, one side of the entire tire and under longitudinal pressures the entire breadth of tire for a short length is subjected to tensile strains, which tend to tear the tread from its base. The strips $e$ and the adhesive facings $e^5$ of the strips $e'$, integrally united to the tread engaging, respectively, the base $f$ and the sides of the strips $e'$, and the said strips $e'$ through the strands $e^6$, which strips $e'$ are firmly attached to the core $c$, resists separation of the tread from the anchoring-strip, and the wings $d'$, engaging the edges of these strips $e$, aid in such resistance. The reinforcing-flaps $g$, embedded in the wings $d'$, transfer a portion of this strain directly to the core $c$, thus distributing the resistance to such strains among all these parts and effectually preventing the tread from tearing away from its base at any point thereunder. The irregular arrangement of the gripping-surfaces between the tread and the anchoring-strip minimizes the tendency of the tread to strip if perchance one portion should become loosened under such tension. The pull on the wing $d'$ will by reason of the disposition of the tread beyond the anchoring-strip be substantially vertical under either side or longitudinal pressures, thus avoiding the shearing strain common to many types of tires. The overhung portions $e^4$ of the anchoring-strip increases the gripping capacity of the portion of the said wings $d'$ between the flaps $g$ and the said strips. The diagonal or irregular arrangement of the strips $e$ distributes the tensile strain among a plurality of these strips, the same strain on no one strip being on a single vertical plane along the entire breadth thereof at one and the same time, which condition would tend to tear such strip bodily from between the adjoining strips $e'$ $e'$.

The entire structure through the adhesion and attachment of the various parts to each other is possessed of a high degree of integrity, which admits of the attachment of the tire without using side rings or flanges of any kind. The portions of the tire adjacent to the felly possess rigidity and stability, and as they do not expand against the retaining means it is merely required that the segmental plates $h$ and the wings $d'$ should be engaged by a bolt-head or washer presenting sufficient bearing-surface to avoid cutting these parts and to retain them in position relative to the felly. Of course, if desired, side rings or flanges may be employed; but they are not deemed necessary nor desirable.

It is not my intention to limit the invention to the details of construction heretofore described, as it is apparent that there may be many deviations therefrom without departing from the spirit and scope of the invention. The exact arrangement and composition of the alternating strips is immaterial, so long as one of them is resilient and capable of permanent attachment to the tread and the other is capable of resisting compression by the tread and so long as these parts present surfaces the gripping capacity of which is different. While I prefer to arrange the anchoring-strip as shown, under some conditions when the tensile strains are not great this precaution against the uprooting of the tentacle-like strips $e$ is of secondary consideration; nor is it material how the anchoring-strip is attached to the core $c$.

Having described the invention, what I claim as new, and desire to have protected by Letters Patent, is—

1. In a vehicle-tire, the combination of a core, an anchoring-strip consisting of alternating strips of resilient material and of substantially non-resilient material arranged upon the outer periphery of said core, means whereby said strip is secured to said core, a resilient tread attached to said anchoring-strip and means whereby said tire is secured to a wheel-felly.

2. In a vehicle-tire, the combination of a core, an anchoring-strip consisting of alternating strips of resilient material and of substantially non-resilient material arranged upon the outer periphery of said core extending transversely of the core, means whereby said anchoring-strip is secured to said core, a resilient tread attached to said anchoring-strip and means whereby said tire is secured to a wheel-felly.

3. In a vehicle-tire, the combination of a core, an anchoring-strip comprising a plurality of parallel longitudinal sections each consisting of alternating strips of resilient material and of substantially non-resilient material arranged upon the outer periphery of said core, means whereby said strip is secured to said core, a resilient tread attached to said anchoring-strip and means whereby said tire is secured to a wheel-felly.

4. In a vehicle-tire, the combination of a core, an anchoring-strip consisting of alternating strips of resilient material and of substantially non-resilient material extending transversely of the core, means whereby said anchoring-strip is secured to said core, a resilient tread mounted upon and attached to the face of said anchoring-strip, side wings therefor flanking said strip and said core and attached to the edges of said strip and means whereby said tire is secured to a wheel-felly.

5. In a vehicle-tire, the combination of a core, an anchoring-strip consisting of alternating strips of resilient material and of substantially non-resilient material extending transversely of the core, means whereby said anchoring-strip is secured to said core, a resilient tread mounted upon and attached to the face of said anchoring-strip, side wings therefor flanking the said strip and said core and attached to the edges of said strip, a reinforcing-flap secured to each side of said core and embedded in each said wing and means whereby said tire is secured to a wheel-felly.

6. In a vehicle-tire, the combination of a core, an anchoring-strip consisting of alternating strips of rubber and of wood blocks wrapped in fabric, an adhesive facing for said fabric and strands passing thereover and about said blocks, means whereby said strip is secured to said core, a resilient tread attached to said anchoring-strip and means whereby said tire is secured to a wheel-felly.

7. In a vehicle-tire, the combination of a core, an anchoring-strip consisting of alternating strips of resilient material and substantially non-resilient material extending transversely of the core, means whereby said anchoring-strip is secured to said core, a resilient tread of gradually-diminished width mounted upon and attached to the face of said anchoring-strip, side wings therefor, flanking the said strip and said core and attached to the edges of said strip, a reinforcing-flap secured to each side of said core and embedded in each said wing and means whereby said tire is secured to a wheel-felly.

8. In a vehicle-tire, the combination of a core, an anchoring-strip consisting of alternating strips of rubber and of wood blocks wrapped in fabric, a fabric-base interposed between said core and said anchoring-strip, means whereby said strip is secured to said core, a resilient tread attached to said anchoring-strip and means whereby said tire is secured to a wheel-felly.

9. In a vehicle-tire, the combination of a core, an anchoring-strip consisting of alternating strips of resilient material and substantially non-resilient material extending transversely of the core and overhanging same, means whereby said anchoring-strip is secured to said core, a resilient tread mounted upon and attached to the face of said anchoring-strip, side wings therefor flanking the said strip and said core, and attached to the edges of said strip, a reinforcing-flap secured to each side of said core and embedded in each said wing and means whereby said tire is secured to a wheel-felly.

10. In a vehicle-tire, the combination of a core, an anchoring-strip consisting of alternating strips of resilient material and of substantially non-resilient material, means whereby said strip is secured to said core, a resilient tread attached to said anchoring-strip and means comprising a plurality of segmental plates adapted to be interposed between said core and a wheel-felly and a plurality of bolts provided with means adapted to flank each side of said tire, said plates and said felly, whereby said tire is secured to a wheel-felly.

11. In a vehicle-tire, the combination of a core, an anchoring-strip consisting of alternating strips of resilient material and of substantially non-resilient material means whereby said strip is secured to said core, a resilient tread attached to said anchoring-strip and means comprising a plurality of segmental plates adapted to be interposed between said core and a wheel-felly and spaced slightly apart, and a plurality of bolts adapted to pass between said plates and provided with means adapted to flank each side of said tire, said plates and said felly, whereby said tire is secured to a wheel-felly.

12. In a vehicle-tire, the combination of a core, an anchoring-strip consisting of alternating strips of resilient material and of substantially non-resilient material means whereby said strip is secured to said core, a resilient tread attached to said anchoring-strip and means comprising a plurality of segmental plates adapted to be interposed between said core and a wheel-felly and spaced slightly apart, a plurality of bolts adapted to pass between said plates, washers interposed between the heads and nuts of said bolts respectively and each side of the tire, said plates and said felly, said washers being upset to compensate for a difference in width between said tire and said felly whereby said tire is secured to a felly.

13. In a vehicle-tire, the combination of a core, an anchoring-strip consisting of alternating strips of resilient material and of substantially non-resilient material, means whereby said strip is secured to said core, a resilient tread attached to said anchoring-strip and means comprising a plurality of segmental plates adapted to be interposed between said core and a wheel-felly and spaced slightly apart, said core being arched between the ends of said plates whereby creeping of the tire is avoided, and a plurality of bolts adapted to pass between said plates and engage said arched portion of said core and provided with means adapted to flank each side of said tire, said plates and said felly, whereby said tire is secured to a wheel-felly.

14. In a vehicle-tire, the combination of a core comprising a continuous band bent to shape, means for securing the adjoining ends thereof consisting of a plate secured to the inside of each said end, a resilient tread secured to said core, and means whereby said tire is secured to a wheel-felly.

15. In a vehicle-tire, the combination of a core comprising a continuous band bent to shape, means for securing the adjoining ends comprising a segmental plate secured to the inside of said ends respectively, a resilient tread secured to said core, and means comprising a plurality of independent segmental plates adapted to be interposed between said core and a wheel-felly and spaced slightly apart, a plurality of bolts adapted to pass between said plates and provided with means adapted to flank each side of the tire, said plates and said felly, whereby said tire is secured to a wheel-felly.

16. In a vehicle-tire, the combination of a core, a resilient tread mounted upon said core, side wings therefor comprising rubber and fabric, means upon said core whereby the rubber of said side wings may be vulcanized thereto to permanently secure the tread to the core, and means whereby said tire is secured to a wheel-felly.

In witness whereof I have hereunto affixed my signature this 26th day of December, 1902, in the presence of two witnesses.

CHARLES A. PETTIE.

Witnesses:
   GEORGE P. BRECKENRIDGE,
   F. T. WENTWORTH.